United States Patent
Chen et al.

(10) Patent No.: US 7,327,129 B2
(45) Date of Patent: Feb. 5, 2008

(54) CURRENT SENSE CIRCUIT AND METHOD FOR A DC-TO-DC CONVERTER

(75) Inventors: Ming-Hsueh Chen, Banchiau (TW); Ming Chu Chien, Dali (TW)

(73) Assignee: Analog and Power Electronics Corp., Hsinchu (TW)

(*) Notice: Subject to any disclaimer, the term of this patent is extended or adjusted under 35 U.S.C. 154(b) by 214 days.

(21) Appl. No.: 11/099,458

(22) Filed: Apr. 6, 2005

(65) Prior Publication Data

US 2005/0285580 A1   Dec. 29, 2005

(30) Foreign Application Priority Data

Jun. 25, 2004  (TW) .............................. 93118435 A

(51) Int. Cl.
*G05F 1/00* (2006.01)
*G01R 19/00* (2006.01)

(52) U.S. Cl. ...................... 323/285; 323/282; 323/907; 702/64

(58) Field of Classification Search ................ 323/282, 323/272, 285, 907, 286, 222; 327/53, 83; 702/64; 324/713
See application file for complete search history.

(56) References Cited

U.S. PATENT DOCUMENTS

| | | | | |
|---|---|---|---|---|
| 5,847,554 | A * | 12/1998 | Wilcox et al. | 323/282 |
| 6,215,290 | B1 * | 4/2001 | Yang et al. | 323/282 |
| 6,424,129 | B1 * | 7/2002 | Lethellier | 323/272 |
| 6,670,794 | B1 * | 12/2003 | Wang et al. | 323/213 |
| RE38,487 | E * | 4/2004 | Isham et al. | 323/224 |
| 6,781,354 | B2 * | 8/2004 | Zhang | 323/224 |
| 7,075,373 | B2 * | 7/2006 | Briskin et al. | 330/298 |

* cited by examiner

*Primary Examiner*—Bao Q. Vu
*Assistant Examiner*—Harry Behm
(74) *Attorney, Agent, or Firm*—Rosenberg, Klein & Lee

(57) ABSTRACT

In a DC-to-DC converter, a current sense circuit and method generate a first current by a first transconductive amplifier responsive to the output current of the converter for a controller to switch a high side switch and a low side switch, a second current from a first voltage by a second transconductive amplifier, a second voltage from the second current by an adjustable resistor, and a bias signal from a difference between the second voltage and a third voltage by a bias apparatus to adjust the transconductances of the first and second transconductive amplifiers.

17 Claims, 6 Drawing Sheets

US 7,327,129 B2

CURRENT SENSE CIRCUIT AND METHOD FOR A DC-TO-DC CONVERTER

FIELD OF THE INVENTION

The present invention is related generally to a DC-to-DC converter, and more particularly, to a current sense circuit and method for a DC-to-DC converter.

BACKGROUND OF THE INVENTION

A DC-to-DC converter switches a high side switch and a low side switch connected in series to generate an output current flowing through an inductor to charge a capacitor to generate an output voltage. To regulate the output voltage, the output current is sensed to modulate the duties of the high side and low side switches. To sense the output current, it is employed the virtual ground characteristic of an operational amplifier, for example in U.S. Pat. No. 6,246,220 issued to Isham et al., or the voltage drop of a sense resistor connected in series with the inductor, for example in product no. ISL6565B of Intersil Corporation, or the conductive resistance of the MOS transistor serving as the low side switch, for example in product no. ISL6563 of Intersil Corporation.

In the circuit of U.S. Pat. No. 6,246,220, a virtually grounded operational amplifier senses the output current to generate a signal for the system control of a converter, while due to the virtually grounded operational amplifier and the negative feedback in the system, the sensing speed is slower than that by using an open loop control. If the slew rate of the operational amplifier is increased to improve the sensing speed, it will be easy to have a greater damping in each sensing operation and result in the operational amplifier poorer stability and the sensed value improper.

In the sensing by using a sense resistor connected in series with the inductor, either the parasitic resistor of the inductor or an external resistor, small resistance is hard to accomplish precise detection, and large resistance consumes much power. Alternatively, the conductive resistance of the low side MOS transistor serving as the sense resistor may sense the current more precisely, while the conductive resistance of the low side MOS transistor is temperature dependent, and error is introduced by the varying resistance once the MOS transistor is operated.

Therefore, it is desired a temperature independent current sense circuit and method for a DC-to-DC converter.

SUMMARY OF THE INVENTION

One object of the present invention is to provide a current sense circuit and method for a DC-to-DC converter.

More particularly, another object of the present invention is to provide a temperature independent current sense circuit and method for a DC-to-DC converter.

Yet another object of the present invention is to provide a current sense circuit and method for a multichannel DC-to-DC converter with reduced elements.

In a DC-to-DC converter having a controller for switching a high side switch and a low side switch connected to each other by a phase node to generate an output current, according to the present invention, a current sense circuit generates a first current by a first transconductive amplifier responsive to the output current for the controller to switch the high side and low side switches, a second current from a first voltage by a second transconductive amplifier, a second voltage from the second current by an adjustable resistor, and a bias signal from a difference between the second voltage and a third voltage by an bias apparatus to adjust the first and second currents by adjusting the transconductances of the first and second transconductive amplifiers. Preferably, the first current is directly generated from the output current in a proportional manner, and it is therefore advantageous to more simple, rapid and accurate operations. In addition, for the first current independent on temperature variations, the bias apparatus generates a bias signal to adjust the transconductances of the first and second transconductive amplifier in response to the difference between the second and third voltages. Preferably, the transconductance of the second transconductive amplifier is substantially equal to that of the first transconductive amplifier. When temperature varies, the adjustable resistor may be adjusted to compensate or eliminate the influence on the first current resulted from the varied temperature, and the first current may be maintained substantially stable.

In a multichannel DC-to-DC converter, according to the present invention, a current sense circuit is used in association with a multiplexer to sense each of the channel currents. The multiplexer is connected between the first transconductive amplifier and the channels of the DC-to-DC converter to switch the first transconductive amplifier to connect with the channels one by one for responding to the channel currents in turn. As such, only a current sense circuit is needed for sensing all the channel currents, and the cost and complexity of the multichannel DC-to-DC converter is reduced.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
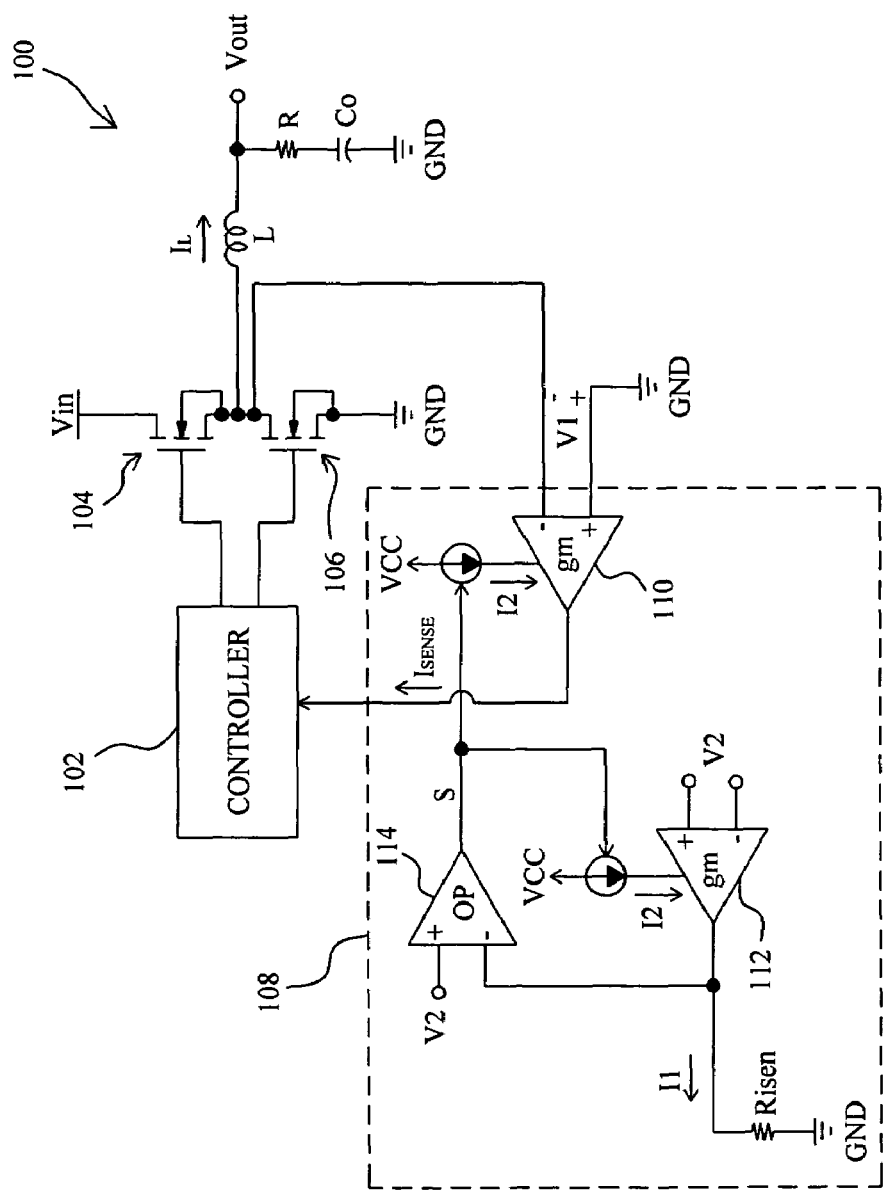
FIG. 1 shows a first embodiment according to the present invention.

FIG. 1 shows a first embodiment of the present invention, a DC-to-DC converter 100 has a controller 102 to switch MOS transistors 104 and 106 connected in series between an input voltage Vin and ground GND to generate an output current $I_L$ flowing through an inductor L to charge a capacitor $C_O$ to generate an output voltage Vout. To regulate the output current $I_L$, a current sense circuit 108 senses a voltage drop V1 across the low side MOS transistor 106 to generate a current $I_{SENSE}$ for the controller 102 to switch the MOS transistors 104 and 106. In the current sense circuit 108, a transconductive amplifier 110 has two inputs connected with the low side MOS transistor 106 to receive the voltage drop V1 therefrom. When the output current $I_L$ flows through the low side MOS transistor 106, the voltage drop across the MOS transistor 106 is $$V1 = I_L \times Rds \quad [\text{EQ-1}]$$

where Rds is the conductive resistance of the MOS transistor 106. The transconductive amplifier 110 transforms the voltage V1 to the current $$I_{SENSE} = V1 \times gm, \quad [\text{EQ-2}]$$

where gm is the transconductance of the transconductive amplifier 110. In the current sense circuit 108, another transconductive amplifier 112 has a transconductance gm substantially equal to that of the transconductive amplifier 110, and transforms a voltage V2 to a current $$I1 = V2 \times gm. \quad [\text{EQ-3}]$$

The current I1 flows through an adjustable resistor Risen, and an operational amplifier 114 has a non-inverting input connected with a voltage V2 and an inverting input connected with an output of the transconductive amplifier 112. Due to the virtual ground characteristic of the operational amplifier 114 between its inputs, the voltage on the inverting input of the operational amplifier 114 is also V2, and accordingly, the current flows through the resistor Risen connected to the output of the transconductive amplifier 112 is $$I1 = V2/\text{Risen}. \quad [\text{EQ-4}]$$

From the equations EQ-3 and EQ-4, it is obtained the transconductance $$gm = 1/\text{Risen}, \quad [\text{EQ-5}]$$

namely, the transconductance gm of the transconductive amplifiers 110 and 112 is inversely proportional to the resistance of the adjustable resistor Risen. As a result, the operational amplifier 114 serves as an automatic bias apparatus for the transconductive amplifiers 110 and 112, and when the resistance of the resistor Risen changes, a bias signal S generated by the operational amplifier 114 changes the bias current I2 of the transconductive amplifiers 110 and 112 and the transconductance gm thereof is changed correspondingly.

From the equations EQ-1 and EQ-2, the current $I_{SENSE}$ is related to the conductive resistance Rds and the transconductance gm. If the conductive resistance Rds of the low side MOS transistor 106 changes with an increased temperature due to the system operating at a large current, the current $I_{SENSE}$ for the controller 102 may be stabilized merely by adjusting the resistance of the adjustable resistor Risen to thereby adjust the transconductance gm, and therefore, the current sense circuit 108 may be exempted from any effect resulted from varied temperature.

Further, from the equations EQ-1, EQ-2 and EQ-5, it is obtained $$I_{SENSE} = I_L \times Rds/\text{Risen}, \quad [\text{EQ-6}]$$

that is, the current $I_{SENSE}$ generated by the current sense circuit 108 is proportional to the output current $I_L$ of the converter 100. Due to the current $I_{SENSE}$ is directly generated from the output current $I_L$ proportionally, the sensing of the output current $I_L$ is in a more rapid and precise manner, compared to conventional sensing by using a virtual grounded operational amplifier in a negative feedback, and there may be avoided the poor stability of the operational amplifier and the damping errors generally encountered in conventional current sense circuits. Furthermore, in the current sense circuit of U.S. Pat. No. 6,246,220, the minimum voltage of the operational amplifier is limited to the ground level and hence only a source current may be sensed, while the current sense circuit of the present invention may sense a source current and a sink current since it is sensed from the voltage drop V1 across the low side MOS transistor 106 by the transconductive amplifier 110. In U.S. Pat. No. 6,246,220, the position of the resistor connected between the low side transistor and the inverting input of the grounded operational amplifier has en effect on the sensing result, and it is thus required for careful design in the layout of the circuit, while the current sense circuit of the present invention senses the output current $I_L$ by use of an open loop technique, so that the layout of the current sense circuit is more flexible. In other embodiments, the voltages connected to the transconductive amplifiers 112 and 114 may be different from each other.

Figure 2:
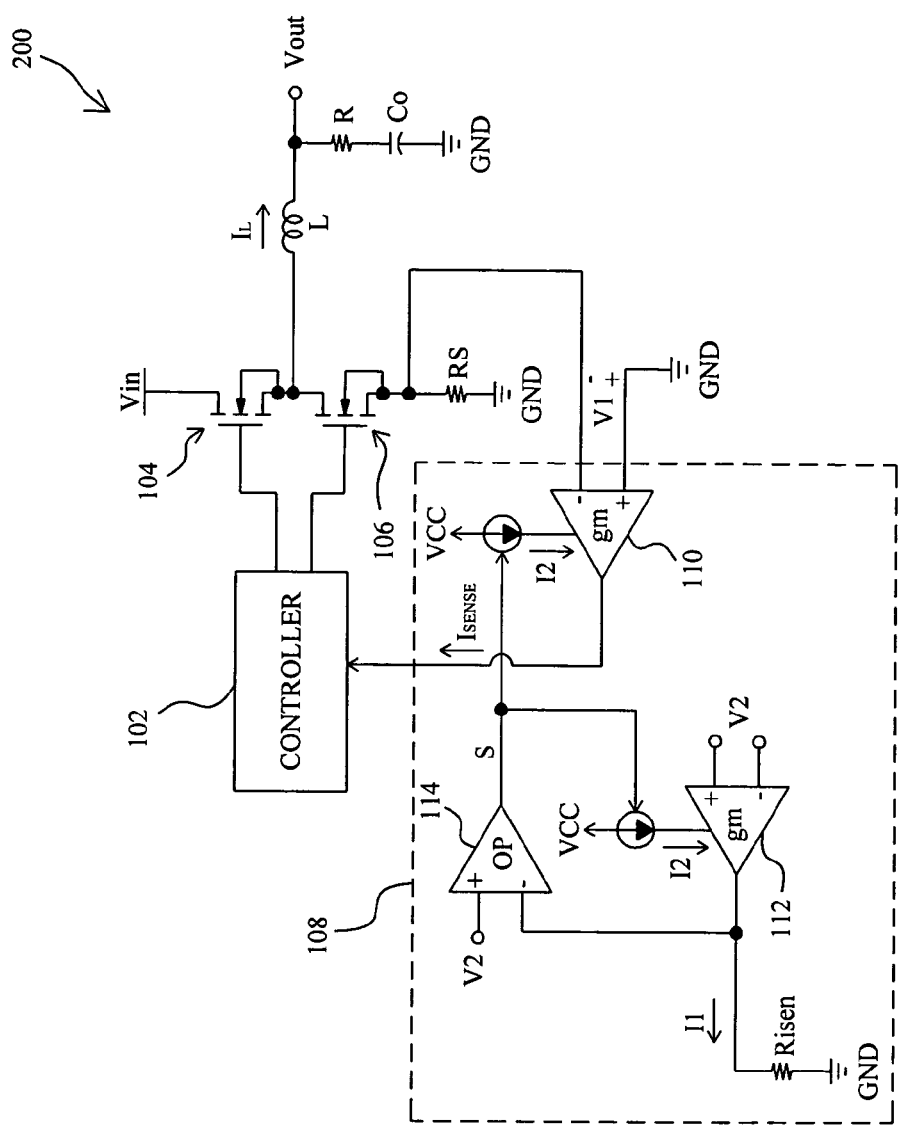
FIG. 2 shows a second embodiment according to the present invention.

FIG. 2 shows a second embodiment of the present invention. A DC-to-DC converter 200 also comprises the controller 102 to switch the pair of MOS transistors 104 and 106 according to a current $I_{SENSE}$ provided by the current sense circuit 108. However, it is the voltage drop V1 across a sense resistor RS connected in series to the low side MOS transistor 106 to be sensed by the transconductive amplifier 110 in the current sense circuit 108 to determine the current $I_{SENSE}$ for the controller 102 to modulate the duties of the MOS transistors 104 and 106. The transconductive amplifier 112 generates a current I1 from a voltage V2 to flow through the adjustable resistor Risen. The operational amplifier 114 is also provided with a voltage V2 to its non-inverting input and its inverting input is connected to the output of the transconductive amplifier 112. Serving as a bias apparatus, the operational amplifier 114 may adjust the transconductance gm of the transconductive amplifiers 110 and 112 by the bias signal S. As temperature varies, the resistance of the adjustable resistor Risen may be adjusted to thereby adjust the transconductance gm of the transconductive amplifiers 110 and 112 by adjusting their bias current I2, so that the current $I_{SENSE}$ for the controller 102 to modulate the duties of the MOS transistors 104 and 106 may be maintained stable and thus exempted from the effect resulted from temperature variations.

Figure 3:
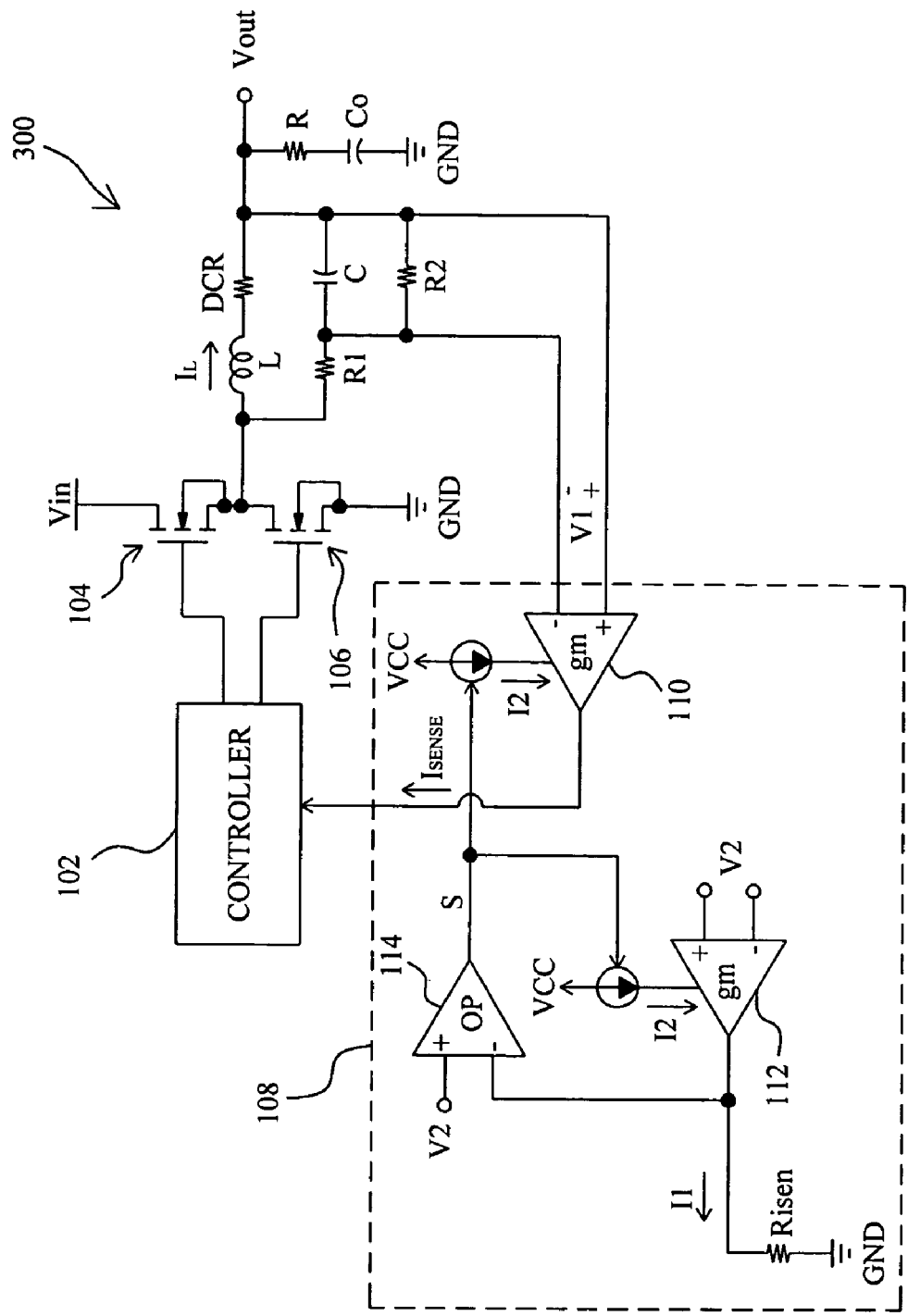
FIG. 3 shows a third embodiment according to the present invention.

FIG. 3 shows a third embodiment of the present invention. A DC-to-DC converter 300 also comprises the controller 102 responsive to a current $I_{SENSE}$ provided by the current sense circuit 108 to switch the MOS transistors 104 and 106, while it is the voltage drop V1 across a parasitic resistor DCR of the inductor L to be sensed by the transconductive amplifier 110 in the current sense circuit 108 to determine the current $I_{SENSE}$ for the controller 102 to modulate the duties of the MOS transistors 104 and 106. Likewise, the transconductive amplifier 112 generates a current I1 from a voltage V2 to flow through the adjustable resistor Risen, and the operational amplifier 114 has a non-inverting input connected with a voltage V2 and an inverting input connected to an output of the transconductive amplifier 112 to adjust the bias current I2 for the transconductive amplifiers 110 and 112 by the bias signal S. As temperature varies, the resistance of the adjustable resistor Risen may be adjusted to thereby adjust the transconductance gm of the transconductive amplifiers 110 and 112, so that the current $I_{SENSE}$ for the controller 102 to modulate the duties of the MOS transistors 104 and 106 may be maintained stable and thus exempted from the effect resulted from temperature variations.

Figure 4:
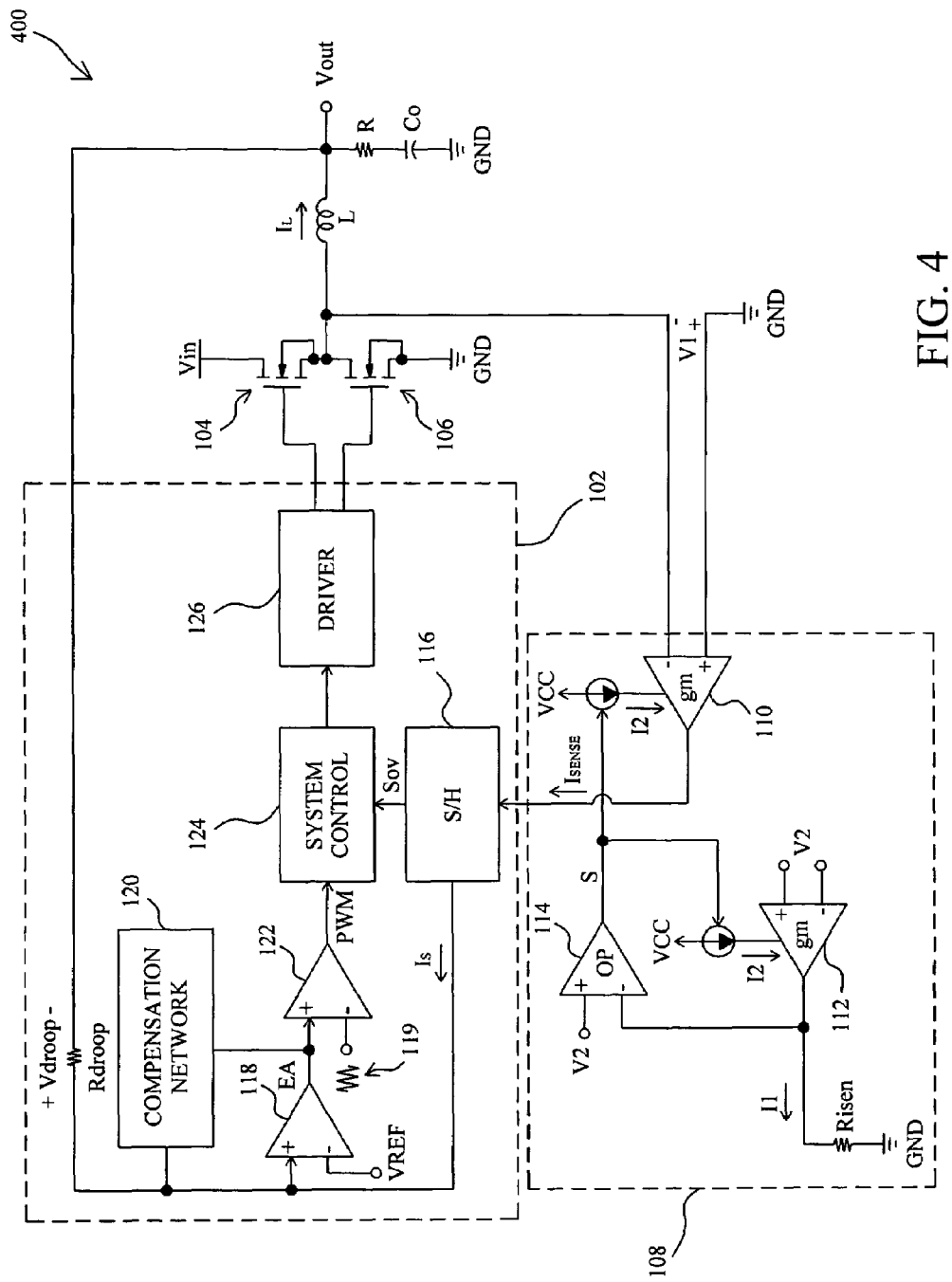
FIG. 4 shows a fourth embodiment according to the present invention.

FIG. 4 shows a fourth embodiment of the present invention. A DC-to-DC converter 400 comprises a controller 102 to switch the MOS transistors 104 and 106 according to a current $I_{SENSE}$ provided by the current sense circuit 108, and it is the voltage drop V1 across the low side MOS transistor 106 to be sensed by the transconductive amplifier 110 in the current sense circuit 108 to determine the current $I_{SENSE}$ for the controller 102 to modulate the duties of the MOS transistors 104 and 106. The transconductive amplifier 112 generates a current I1 from the voltage V2 to flow through the adjustable resistor Risen, and the inputs of the operational amplifier 114 are connected with a voltage V2 and an output of the transconductive amplifier 112. In the controller 102, a sample and hold circuit 106 is provided to sample and hold the current $I_{SENSE}$ to generate a current Is and a signal Sov, and a system control 124 receives the signal Sov as an indication of determining if an over-current protection or a short circuit protection is needed to prevent the MOS transistors 104 and 106 from damages. The output voltage Vout of the converter 400 is fed back by a droop resistor Rdroop to an error amplifier 118 in the controller 102 to be compared with a reference voltage VREF to thereby generate an error signal EA, and the error signal EA is compensated by a compensation network 120 as in a typical DC-to-DC converter. The compensated error signal EA is supplied together with a ramp signal 119 to a pulse width modulation (PWM) generator 122 to generate a PWM signal for the system control 124 to control a drive 126 to switch the MOS transistors 104 and 106. The current Is generated by the sample and hold circuit 116 flows through the droop resistor Rdroop to fine tune the output voltage Vout of the converter 400 to reduce the effect resulted from the load transient on the output voltage Vout.

Figure 5:
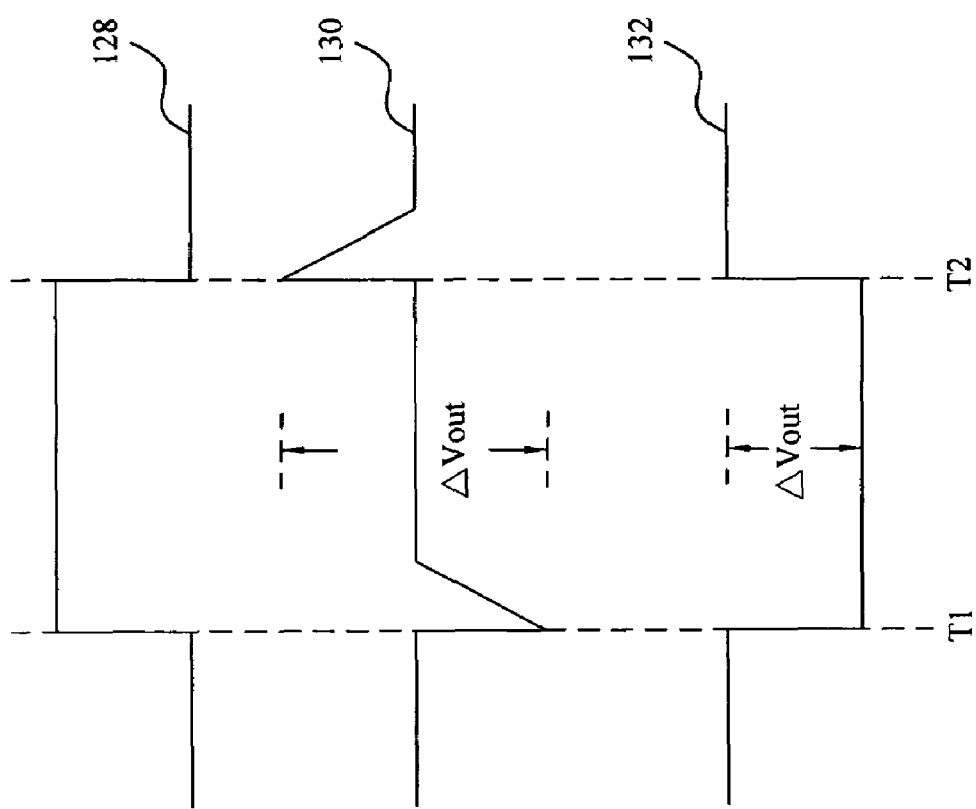
FIG. 5 shows waveforms of the output currents and voltages of a conventional DC-to-DC converter and the converter shown in FIG. 4 in response to a load transient.

FIG. 5 shows waveforms of the output currents and voltages of a conventional DC-to-DC converter and the converter shown in FIG. 4 in response to a load transient. When the load changes from light to heavy at time T1, the output current $I_L$ increases dramatically, as shown by waveform 128, and in a conventional DC-to-DC converter the output voltage Vout drops suddenly and then recovers to its original level, as shown by waveform 130. When the load changes from heavy back to light at time T2, the output current $I_L$ drops back to low level, as shown by the waveform 128, and the output voltage Vout of a conventional DC-to-DC converter increases suddenly and then recovers to its original level, as shown by the waveform 130. The maximum and minimum of the output voltage Vout have a difference ΔVout therebetween. If the voltage difference ΔVout between the suddenly changed output voltages as from heavy load to light load and from light load to heavy load is too large, the load circuit connected at the output of the DC-to-DC converter may be damaged. Referring to FIG. 4 and FIG. 5, in the DC-to-DC converter 400, when the load changes from light to heavy at time T1, the output current $I_L$ increases dramatically, as shown by the waveform 128, and the output voltage Vout drops suddenly, as shown by the waveform 132. While the currents $I_{SENSE}$ and thereby Is increase in response to this load transient, the voltage drop Vdroop across the droop resistor Rdroop increases, causing the output voltage Vout at a lower level. When the load changes from heavy back to light at time T2, the output current $I_L$ and the output voltage Vout recover to their original levels. As a result, the converter 400 may efficiently reduce the difference ΔVout of the output voltage Vout in response to the load transient.

Figure 6:
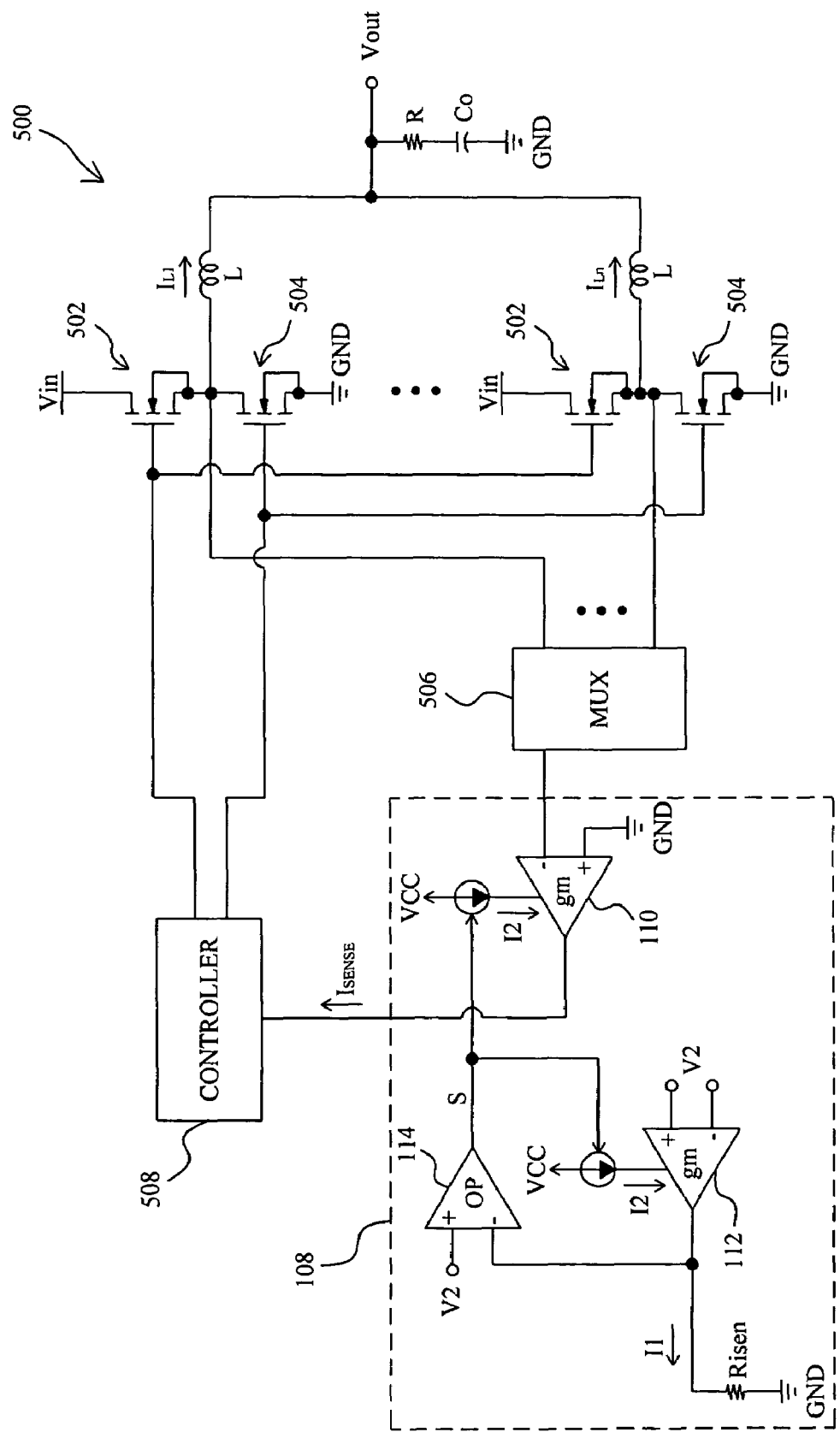
FIG. 6 shows an application of one current sense circuit of the present invention for a multichannel DC-to-DC converter.

FIG. 6 shows an application of one current sense circuit of the present invention for a multichannel DC-to-DC converter. A DC-to-DC converter 500 has a plurality of channels, each including a high side MOS transistor 502 and a low side MOS transistor 504 connected in series between an input voltage Vin and ground GND to be alternatively switched by a controller 508, to generate a plurality of channel currents $I_{L1}$-$I_{Ln}$, each flowing through an inductor L to charge a capacitor Co to generate an output voltage Vout. The current sense circuit 108 senses the channel currents $I_{L1}$-$I_{Ln}$ in turn, to generate a current $I_{SENSE}$ for the controller 508 to switch the MOS transistors 502 and 504 of the respective channel. The current sense circuit 108 comprises the transconductive amplifiers 110 and 112, operational amplifier 114, and adjustable resistor Risen, as the aforementioned embodiments do. By use of a multiplexer 506 between the current sense circuit 108 and the channels, the transconductive amplifier 110 is connected with the channel currents $I_{L1}$-$I_{Ln}$ one by one, each time only one of the channel currents $I_{L1}$-$I_{Ln}$ is sensed and the generated current $I_{SENSE}$, $I_{SENSEj}$ for $I_{Lj}$, j=1, 2, ..., n, is used to modulate the duties of the MOS transistors 502 and 504 of the sensed channel. With the multiplexer 506, only one current sense circuit 108 is required for all the channels of the converter 500, which is quite different from conventional multichannel DC-to-DC converters that require one current sense circuit for one channel, and therefore, the cost of the multichannel DC-to-DC converter 500 is greatly reduced as compared with conventional multichannel DC-to-DC converters. Furthermore, conventional multichannel DC-to-DC converters have the offset issue due to the parameter variations between the components in different channels, while the multichannel DC-to-DC converter 500 has no such issue since only one current sense circuit is used for all channels.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A current sense circuit for a DC-to-DC converter having a controller for switching a high side switch and a low side switch connected to each other by a phase node to generate an output current, the current sense circuit comprising:
    a first transconductive amplifier responsive to the output current for generating a first current for the controller to switch the high side and low side switches;
    a second transconductive amplifier for generating a second current from a first voltage;
    variable resistor for adjustably generating a second voltage from the second current; and
    a bias apparatus for generating a bias signal from a difference between the second voltage and a third voltage to adjust a first transconductance of the first transconductive amplifier and a second transconductance of the second transconductive amplifier, whereby the first and second transconductances are adaptively adjusted in value responsive to variation of the variable resistor.

2. A current sense circuit for a DC-to-DC converter having a controller for switching a high side switch and a low side switch connected to each other by a phase node to generate an output current, the current sense circuit comprising:

a first transconductive amplifier responsive to the output current for generating a first current for the controller to switch the high side and low side switches;

a second transconductive amplifier for generating a second current from a first voltage;

a variable resistor for adjustably generating a second voltage from the second current; and a bias apparatus for generating a bias signal from a difference between the second voltage and a third voltage to adjust a first transconductance of the first transconductive amplifier and a second transconductance of the second transconductive amplifier;

wherein the third voltage is substantially equal to the first voltage.

3. The current sense circuit of claim 1, wherein the second current is substantially proportional to the first current.

4. The current sense circuit of claim 1, wherein the first transconductive amplifier generates the first current from a voltage drop across the low side switch or the high side switch.

5. The current sense circuit of claim 1, wherein the first transconductive amplifier generates the first current from a voltage drop across a sense resistor connected in series with the low side switch or the high side switch.

6. The current sense circuit of claim 1, wherein the first transconductive amplifier generates the first current from a voltage drop across a parasitic resistor within an inductor connected to the phase node and flowing the output current therethrough.

7. A current sense method for a DC-to-DC converter having a controller for switching a high side switch and a low side switch connected to each other by a phase node to generate an output current, the method comprising the steps of:

sensing the output current for generating a first current for the controller to switch the high side and low side switches;

generating a second current from a first voltage;

generating a second voltage from the second current;

generating a third voltage substantially equal to the first voltage; and adaptively generating a bias signal from a difference between the second voltage and a third voltage to adjust the first and second currents, the second voltage being adjusted responsive to variation of a variable resistor.

8. The method of claim 7, wherein the second current is generated substantially proportional to the first current.

9. A current sense circuit for a DC-to-DC converter having a controller for modulating a plurality of channels each having a high side switch and a low side switch connected to each other by a phase node to be switched to generate a channel current, the current sense circuit comprising:

a first transconductive amplifier responsive to each of the plurality of channel currents in turn for generating a first current for the controller to switch the high side and low side switches of each respective one of the plurality of channels;

a second transconductive amplifier for generating a second current from a first voltage;

variable resistor for adjustably generating a second voltage from the second current; and a bias apparatus for generating a bias signal from a difference between the second voltage and a third voltage to adjust a first transconductance of the first transconductive amplifier and a second transconductance of the second transconductive amplifier.

10. The current sense circuit of claim 9, further comprising a multiplexer connected between the first transconductive amplifier and the plurality of channels for the first transconductive amplifier to respond to the plurality of channel currents in turn.

11. The current sense circuit of claim 9, wherein the third voltage is substantially equal to the first voltage.

12. The current sense circuit of claim 9, wherein the second current is substantially proportional to the first current.

13. The current sense circuit of claim 9, wherein the first transconductive amplifier generates the first current from a voltage drop across the low side switch or the high side switch of the sensed channel.

14. The current sense circuit of claim 9, wherein the first transconductive amplifier generates the first current from a voltage drop across a sense resistor connected in series with the low side switch or the high side switch of the sensed channel.

15. The current sense circuit of claim 9, wherein the first transconductive amplifier generates the first current from a voltage drop across a parasitic resistor within an inductor connected to the phase node and flowing the channel current therethrough in the sensed channel.

16. A current sense method for a DC-to-DC converter having a controller for modulating a plurality of channels each having a high side switch and a low side switch connected to each other by a phase node to be switched to generate a channel current, the method comprising the steps of:

sensing the plurality of channel currents in turn for generating a first current for the controller to switch the high side and low side switches of each respective one of the plurality of channels;

generating a second current substantially proportional to the first current from a first voltage;

generating a second voltage from the second current; and adaptively generating a bias signal from a difference between the second voltage and a third voltage to adjust the first and second currents, the second voltage being adjusted responsive to variation of a variable resistor.

17. The method of claim 16, wherein the third voltage is generated substantially equal to the first voltage.

* * * * *